July 25, 1944.   E. IBACH   2,354,637
METHOD OF DECORATING ARTICLES
Filed May 14, 1941   3 Sheets-Sheet 1
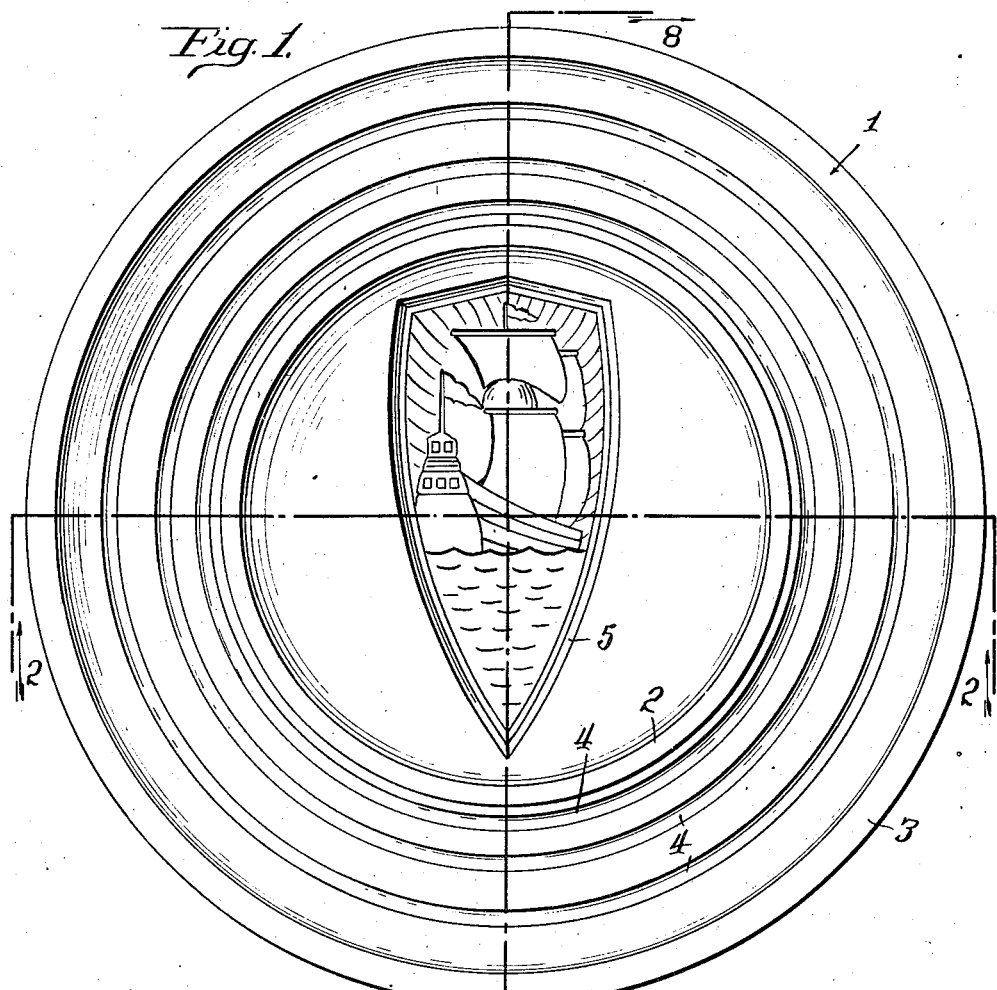
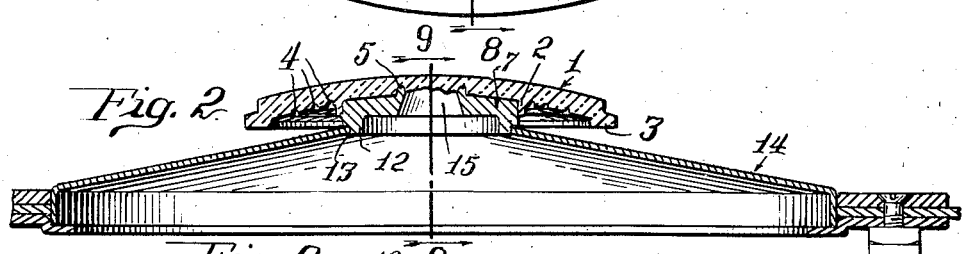
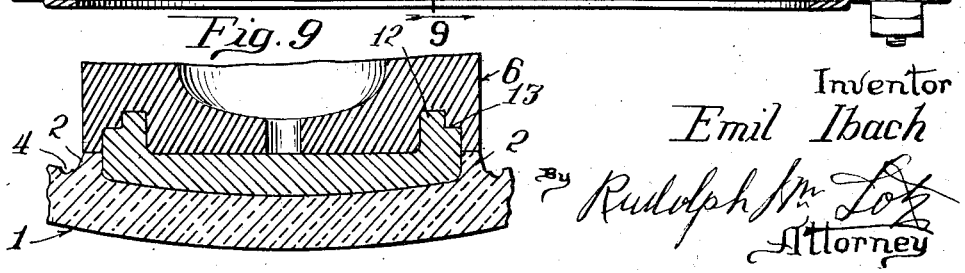
Inventor
Emil Ibach
By Rudolph Wm. Lotz
Attorney July 25, 1944.  E. IBACH  2,354,637
METHOD OF DECORATING ARTICLES
Filed May 14, 1941  3 Sheets-Sheet 2
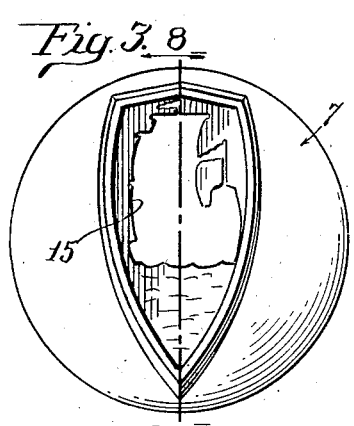
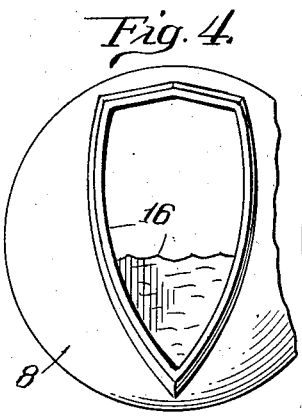
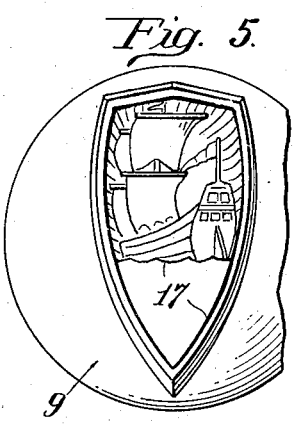
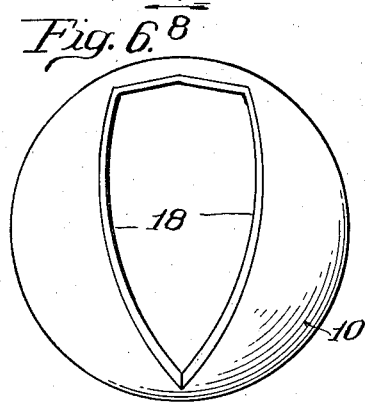
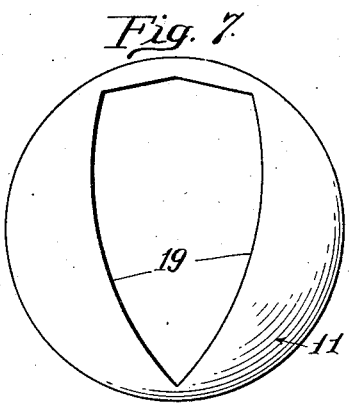
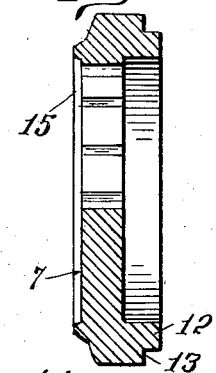
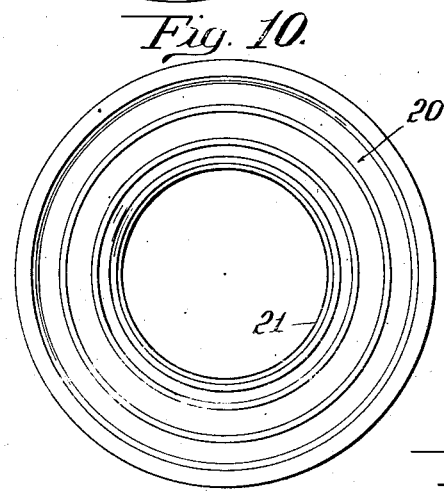
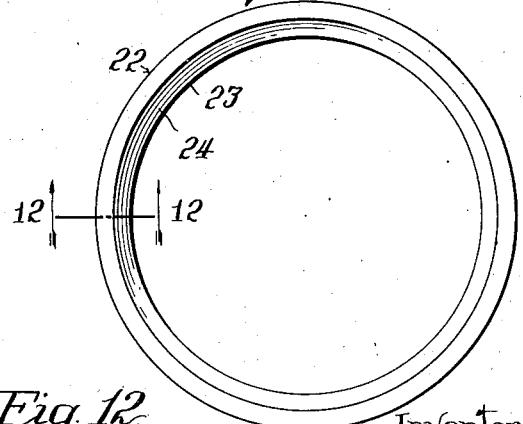
Inventor
Emil Ibach July 25, 1944.  E. IBACH  2,354,637
METHOD OF DECORATING ARTICLES
Filed May 14, 1941  3 Sheets-Sheet 3
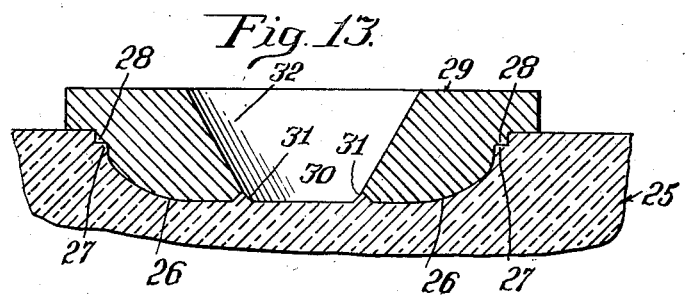
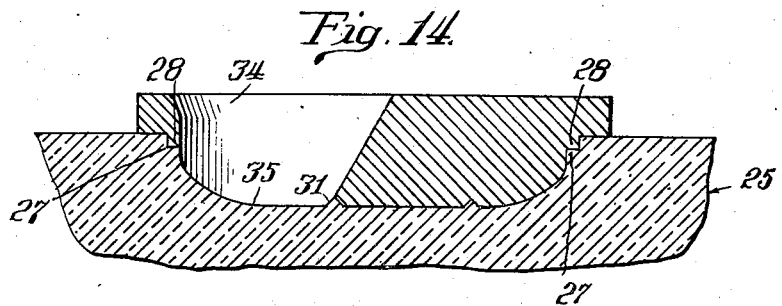
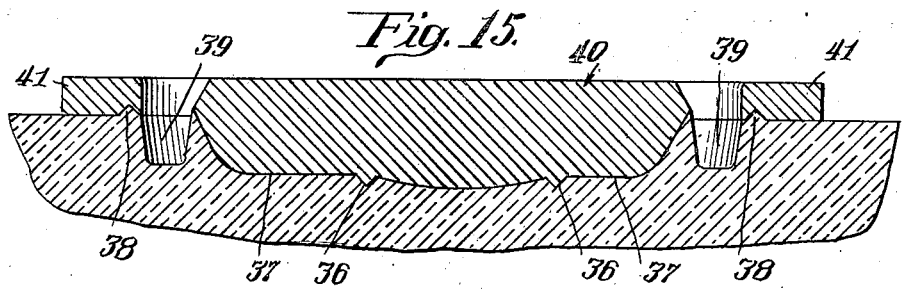
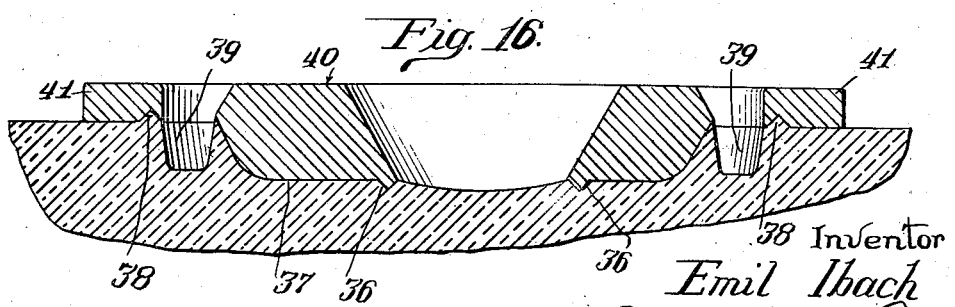
Inventor
Emil Ibach
By Rudolph Jr. Lotz
Attorney Patented July 25, 1944

2,354,637

UNITED STATES PATENT OFFICE 2,354,637

METHOD OF DECORATING ARTICLES

Emil Ibach, Chicago, Ill., assignor to Cruver Manufacturing Company, Chicago, Ill., a corporation of Illinois Application May 14, 1941, Serial No. 393,465

6 Claims. (Cl. 101—129)

This invention has for its main object to provide a novel, cheap and rapid method of decorating articles and is designed mainly for effecting the decoration of articles such as moulded plastics and stampings and die castings produced in large numbers and to which the term "mass production" may be applied.

The method of the invention is designed primarily to overcome difficulties incident to the decoration of articles of the aforesaid types, which present areas of depression of different depths and contours disposed to meet along sharp ridges or which meet the edges of depressions of greater depth or which meet the side faces or side edges of ribs or the like, and wherein predetermined areas are required to have paints, enamels and the like of respectively different colors applied thereto without causing any of the coloring applied to one area to be applied to a contiguous area designed to be differently colored.

These difficulties have resulted in the rejection of a very large percentage of decorated articles because of the unavoidable splashing or spraying of the liquid coloring matter beyond the borders of the particular area or areas intended to be covered thereby.

Avoiding this cause of rejections of the decorated articles has become such a problem that it has necessitated the employment of highly skilled operators and has also increased the prices for the decorated articles because of the price of this skilled labor and also the rejections which even skilled labor cannot overcome.

In instances where the surface to be decorated is plane throughout its whole area or is only embossed, it has been possible to cut stencils out of sheets of suitable material which are used in the ordinary manner to cover certain areas and expose others and thus minimize the number of rejections due to the absence of sharply defined contiguous differently colored areas, but in the decoration of very small contiguous areas specified to be differently colored in a multiplicity of shades or lines, the ordinary stenciling means cannot be used successfully.

The present invention has for one of its main objects to provide a novel type of stencil and a method of producing and using the same which obviates the necessity of employing highly skilled labor and which may be carried out by unskilled persons and still reduce the percentage of rejections from an average of about thirty to an average of five.

This invention includes as another of its main objects the utilization of one of the articles to be decorated as a mold for the production of the masks or stencils to be used subsequently in effecting the decoration of said articles.

In the accompanying drawings, illustrating the manner in which the method of the present invention may be carried out, Fig. 1 is a reverse face view of an article composed of a transparent material decorated on said face, its obverse face being devoid of decoration.

Fig. 2 is a substantially diametric sectional view on a reduced scale, through the article of Fig. 1 and through a mask applied to the reverse face thereof and through a support for said mask.

Figs. 3, 4, 5, 6 and 7 are face views of masks employed for the decoration of the central portion of the article of Fig. 1 drawn on a smaller scale than the latter.

Fig. 8 is a diametric sectional view of a mask taken on the line 8—8 of Fig. 3.

Fig. 9 is a fragmentary, diametric sectional view showing the central portion of the article of Fig. 1 inverted and used as a mold part in conjunction with a companion mold part to form a complete mold in which the masks of Figs. 3 to 7 inclusive, are cast.

Figs. 10 and 11 are face views on a reduced scale of additional masks adapted to be used for decorating the article of Fig. 1 after the masks of Figs. 3 to 7 inclusive, have been used.

Fig. 12 is a fragmentary detail radial sectional view taken on the line 12—12 of Figs. 11.

Figs. 13 to 16 inclusive are diagrammatic fragmentary sectional views of articles to be decorated having masks applied thereto and illustrating an important feature of the invention.

The article 1 may be assumed to be a disk composed of transparent material, such as glass, Lucite, Celluloid, or the like, which has been formed by casting or otherwise, in a mold. In the instance illustrated the outer or obverse face of the disk is substantially spheroconvex while its reverse face is generally concave. The shape of said disk 1 peripherally and the contour of its observe face are merely exemplary as is also the contour of its reverse face.

In this exemplary instance, the reverse face of the disk 1 presents a circular rib 2 concentric with the circumferential edge of said disk which is also provided with an annular edge flange or rib 3 and with a series of circular grooves 4 concentric with the ribs 2 and 3.

Within the circular field bordered by the rib 2 there is impressed into the disk a groove or recess 5 shaped to constitute the border or outline of a shield. Said groove 5 is coated with a silver paint or the like over all of its walls or surfaces in this example.

Within the area bordered by the groove 5 there is impressed into the disk the representation of a square rigged ship with its sails bellied by wind, the sail being given that appearance by rendering concave the cavities or hollows outlined by their edges. The sails and hull of the ship are spaced from the groove 5 and in this instance are also colored silver.

The hull of the ship appears to be partly immersed in deep blue water covering substantially all of the lower half of the shield shaped area and into which a series of wavy concave hollows are impressed which meet in sharply defined wavy lines or ridges.

The area bordered by the edges of the hull of the ship and its sails and by the groove 5 is coated with a gold colored paint and has fine grooves impressed into the same as shown. This last-named area extends downwardly at a sharp inclination from the edges of sails and hull to the inner wall of the groove 5.

The area between the groove 5 and the rib 2 is colored light brown. The face of the rib 2 is colored black and the entire remainder of the reverse face of the disk 1 is also colored brown.

The foregoing describes the disk 1 in its ultimate decorated condition, the colors mentioned being merely exemplary, of course.

In Fig. 1 the shield shaped area is drawn on a scale approximately thrice the actual size of the sample article from which the drawings are made. This is mentioned because it makes more apparent the difficulties incident to coating each of the aforesaid composite elements of the ultimate picture with the desired color of paint or enamel without causing such paint to extend beyond the area intended to be coated therewith by the paint spraying method in particular and the employment of unskilled operators.

Prior to beginning the aforesaid decorating steps, one of the disks 1 is used as a mold part, as shown in Fig. 9, by inverting said disk and applying over the central area bounded by the rib 2 and over said rib, a companion mold member 6 to form a mold cavity into which any suitable material, such as a plastic or a soft metal having a very low melting point, may be introduced, preferably by pressure, for obvious reasons, to form the series of masks of Figs. 3 to 7 inclusive, the number of said masks being determined, as hereinafter set forth. Said masks are indicated by the reference numerals 7, 8, 9, 10, and 11, and upon the face of each thereof there is produced by the molding process, the replica in bas relief of the aforesaid elements of the above-described picture in its initial state.

Each mask is equipped with an annular flange 12 partly cut along its outer corner to provide an annular shoulder 13 adapted to rest upon the rim of the circular central opening in a plate 14, the lower extremity of said flange 13 projecting into said opening.

After producing the masks as aforesaid and before using the same, holes are cut through them by means of a scroll saw, or the like. In the instance illustrated the opening in the mask 7 is of exactly the shape and size of the area covered by the hull and sails of the ship. The opening in the mask 8 corresponds in shape and size with the area of the shield occupied by the hull and sails of the ship and the surrounding gold colored and streaked area of the shield. The opening in the mask 9 corresponds in shape and size with the deep blue water area of the shield. The opening in the mask 10 is of the shape and size of the shield area bordered by the inner wall of the groove 5. The opening in the mask 11 is of the shape and size of the outer wall of the groove 5.

It is preferable to first decorate the innermost area of the pattern, design or picture, which, in this instance is that of the hull and sails of the ship to which color is applied through the openings 15 in the mask of Fig. 3. Due to the snug fit of the mask with the hollows or depressions surrounding this area, none of the paint projected upon or applied to said area, can find its way to the said surrounding areas and to assure the close contact between mask and said areas, it is desirable that the operator exert the pressure upon substantially the center of the article, although suitable clamping means may be employed for that purpose.

Following application of the mask 7, the mask 8 is applied and gold paint applied through the opening therein to cover the ship area previously coated and the area bordering the same.

The mask 8 is then removed, the gold paint allowed to dry and then either the mask 9 or 10 may be applied and the deep blue paint projected through the opening 17 or 18.

Preferably the mask 9 is applied instead of the mask 10 and only the blue area covered with the deep blue paint and said mask 9 then removed to enable the operator to rub off blue paint from the wavy ridges of the blue area before the paint is dry, to produce irregular dot and dash line effects along said ridges.

After this operation the mask 10 is applied or the mask 11 may be applied. If the former, then white or silver paint is applied over the entire shield area which will cause the bare dash lines produced by rubbing off the blue paint in spots from the ridges to be coated with the white or silver paint and which become visible from the obverse face of the disk. If both the wave crests and the shield border are to be coated with silver paint, then the mask 10 may be omitted and only the mask 11 used for this final paint coating operation covering the shield.

Obviously, the mask 9 may be omitted and the mask 10 used to effect the blue paint coating of the water area since the blue paint may coat the previously silver and gold crested areas.

After the walls of the shield shaped groove have been coated with silver paint and the latter dried, the plate 14 is removed and is replaced by a similar plate having a central opening of larger diameter than the rib 2, as for example, a diameter greater than that of the disk 1 and which is adapted to support a mask, such as the mask 20 of Fig. 10 which has a central opening 21 equal in diameter to the inner diameter of the rib 2 and through which light brown paint is sprayed or applied over the entire area bordered by said rib.

The mask 20 is then removed and, after the last-named paint coat is dry, is replaced by a similar mask having an opening of diameter equal to the outer diameter of the rib 2, the exposed face of the latter being then coated with black paint.

The last-named masks 20 are also produced by molding them, using the disk 1 as a mold and cutting the central openings 21 through the same.

After the black paint coat is dry, the disk 1 is disposed over a mask 22 (Fig. 11) having the central opening 23, which is mounted upon another plate, similar to the plate 14, having a sufficiently large central opening bordered by a rim to support said mask 22. The said central opening 23 has, preferably, a beveled inner wall 24 of very slightly smaller diameter at its lower end than the outer diameter of disk 1, so that the latter's annular flange 3 is completely exposed along its lower face for the application of a paint coat thereto which, preferably, is applied to the entire lower or reverse face of the disk, the decoration of which is thus completed.

The word "diameter" as used herein shall be taken to be synonymous with the words "diametric dimensions" as applied to articles of non-circular shape.

Fig. 9 is intended only to illustrate how the masks may be molded without reference to any pattern or design on the bottom face thereof and is, therefore, not a true sectional view on the line 9—9 of Fig. 2, but is deemed to be sufficient for purposes of illustration.

The word "paint" as used herein will include any coloring substance suited to the purpose, it being preferable that such substance be of a sufficiently viscous nature as to prevent it from flowing beyond the predetermined area of application thereof by capillary attraction, such substance being applied, preferably by means of paint spraying equipment.

A very important and novel feature of the invention resides in equipping with a paint spread obstruction formation bordering each face portion of the article to which paint of a color differing from that to be applied to the next adjacent face portion or portions, such comprising either a rib or a groove, the counterpart of which is formed in the mask molded by a casting suitable method, as above described, completely surrounds each such face portions of both article and mask to prevent the intrusion of paint applied to a given surface portion or area into or upon adjacent face portions of areas and constitutes a division element between adjacent face portions or areas.

Thus, as shown in Fig. 13, the article 25 is provided with a cavity 26 which is bordered by a corner portion presenting a very small peripheral recess 27, which is filled by a corresponding projecting formation 28 of the mask 29.

In the bottom of the cavity 26, there is a centrally disposed face portion 20 bordered by a peripheral, preferably V-shaped rib 31 which, in the formation of the mask, forms a corresponding recess in the latter. The opening 32 in the mask, through which paint is applied to the face portion 30 is so cut or formed that its lower end is flush with the inner face of the rib 31, and fits the outer face of the latter snugly, so that the applied paint will cover the face portion 30 and the inner face of the rib 31.

Another mask 33 is provided with the opening 34 which is flush with the outer face of the rib 31 and with the upper edge of the cavity 26 excluding the recess 27, a face portion of said cavity bordered by said rib 31, in part at least, by the recess 27 and with another or other ribs 31 (not shown), so that paint applied through said opening may cover the predetermined face portion of the cavity so bordered. Each succeeding mask will be provided similarly with an opening or openings bordered by formations adapted to co-operate with the border formations of the several face portions of the article to attain the desired results.

Each mask, 29 and 33, will be equipped with the annular flange 12, shown in Fig. 8.

In Figs. 15 and 16, the said border formations consist of grooves 36 in the bottom of the cavity 37 and the rib 38 bordering the latter.

In said Figs. 15 and 16, the cavity 37 is bordered also by a deep groove 39 which may be of any shape, and two masks, 40 and 41, are shown filling the cavity and bordering the groove to provide a space therebetween through which paint is applied to the walls of said groove 39. The mask 40 may be also provided with an opening 42 through which paint of the same color as that which is applied to the walls of the groove may be applied to the face portion of the article bordered by a groove 36. The masks 40 and 41 may be devoid of the annular flange 12, aforesaid.

The said formations consisting of the ribs 31, the groove 27, the ribs 30, the grooves 36 and the rib 38 are substantially microscopic in cross-section but are shown on a very much enlarged scale in the drawings. They constitute obstructions to the spreading of paint to a degree apt to cause rejections of the decorated articles. They are purposely omitted from Figs. 1 to 12 inclusive because of the difficulty of properly illustrating them.

From the foregoing description it will be obvious that the decorating of articles with most intricate and delicate patterns, designs and pictures can be accomplished easily and quickly by unskilled persons, it being preferable in practice to move the article to be decorated progressively to a number of different operators, each of whom applies only one mask and one color to the articles, the rate of progression being such that the applied paint will be dried between successive paint applications.

While the method is described as applied to a picture, pattern or design impressed into the surface of the article and constituting an intaglio, so that said picture, pattern or design reproduced on the masks appears in bas relief, the reverse will apply as where the picture, pattern or design is produced in bas relief on the articles and becomes impressed into the faces of the masks as an intaglio.

The term "pattern" or design will include embossings and the term "design" as used in the appended claims will include all types of ornamentation and the like, impressed into or projecting from the surface of the article.

In the instance illustrated the intaglio includes the rib 2, the peripheral flange of the article and the grooves in the area bordered by the latter and said rib.

In place of utilizing the disk 1 in whole or in part as a mold element, as shown in Fig. 9 and hereinabove described, the material of the mask may be introduced by casting or pressure or the like, into and to fill or substantially fill the central cavity bordered by the rib 2, for example, and thereafter or while said material is setting in said cavity, a ring of the cross-sectional shape of the flange of the mask shown in Figs. 8 and 9 may be secured to the resulting blank from which the mask is made, by cutting away or otherwise removing a portion or portions of the blank to expose predetermined areas of the article as hereinabove described.

The word "casting" and the word "molding," respectively, as used hereinabove and in the appended claims, shall be deemed to be synonymous as including any moldable type of material and method of molding same, adapted to the purpose of producing the blanks for and the ultimate masks resulting from the removal of parts of the blanks.

I claim as my invention:

1. The method of decorating articles by application to predetermined surface portions or areas of the same of a selected variety of respective colors, which consists in providing barriers between said areas for isolating the same from contiguous areas, then utilizing the article as a mold for forming a mask and applying thereto a moldable material to cover the entire series of areas of the article intended to be decorated, together with barriers, allowing said material to harden while applied to the mold and then removing the same and repeating said molding operation until a number of masks corresponding with the number of said isolated areas has been completed, then cutting through each mask an opening corresponding in shape and size with one of said respective isolated areas of the article within the reproduction of the barrier formed on the mask, then applying the masks successively to the article to cause the barriers of the latter to be engaged with said reproductions of the same appearing on the mask, and projecting paints of respective selected colors through the openings of the mask in the order of their application to and removal from the article following the drying of each previously applied paint coating.

2. The method of decorating articles by application to predetermined surface portions or areas of the same of a selected variety of respective colors, which consists in providing barriers between said areas for isolating the same from contiguous areas, then utilizing the article as a mold for forming a mask and applying thereto a moldable material to cover the entire series of areas of the article intended to be decorated, together with barriers, allowing said material to harden while applied to the mold and then removing the same and repeating said molding operation until a number of masks corresponding with the number of said isolated areas has been completed, then cutting through each mask an opening corresponding in shape and size with one of said respective isolated areas of the article within the reproduction of the barrier formed on the mask, then applying the mask successively to the article to cause the barriers of the latter to be engaged with said reproductions of the same appearing on the mask, and projecting paints of respective selected colors through the openings of the mask in the order of their application to and removal from the article following the drying of each previously applied paint coating, and then after all of said areas have been coated with paint and the last mask has been removed, spraying a protective coating of paint over all of said areas and the said barriers.

3. The method of producing ornamented articles which consists in first constructing a mold for the production of articles wherein means are provided for forming barriers between contiguous surface areas of the molded article to be sprayed with paint for isolating the same from each other, then utilizing one or more of the molded articles as a mold or molds for the production of masks and applying a suitable moldable material to cover the entire composite area and barriers of the article used as a mold and allowing said material to harden while so applied, removing the same and repeating said molding operation until a number of masks corresponding with the number of said isolated areas has been completed, then cutting through each mask an opening corresponding in shape and size with one of said respective isolated areas of the article within the reproduction of the barrier formed on the mask, then applying the masks successively to the article to cause the barriers of the latter to be engaged with said reproductions of the same appearing on the mask and projecting paints of respective selected colors through the openings of the masks in the order of their application to and removal from the article following the drying of each previously applied paint coating.

4. The method of producing ornamented articles which consists in first constructing a mold for the production of the article wherein means are provided for forming barriers between contiguous surface areas of the molded article to be sprayed with paint for isolating the same from each other, providing a companion mold member to cooperate with one or more of said molded articles to form a mold cavity of which the entire surface portion to be decorated forms a wall, then filling said cavity with a moldable material adapted to harden for the production of a series of masks corresponding in number with the number of different colors to be applied to the respective isolated areas and after said material is hard, removing the resulting mask from the mold, then cutting through each mask an opening corresponding in shape and size with one of said respective isolated areas of the article within the reproduction of the barrier formed on the mask, then applying the masks successively to the article to cause the barriers of the latter to be engaged with said reproductions of the same appearing on the mask and projecting paints of respective selected colors through the openings of the masks in the order of their application to and removal from the article following the drying of each previously applied paint coating.

5. The method of producing ornamented articles which consists in first constructing a mold for the production of the article wherein means are provided for forming barriers between contiguous surfaces of the molded article to be sprayed with paint for isolating the same from each other, providing a companion mold member to cooperate with one or more of said molded articles to form a mold cavity of which the entire surface portion to be decorated forms a wall and wherein said companion mold member is shaped to impart to the face of the mask opposed to that contacting said wall a predetermined shape, removing the same and repeating said molding operation until a number of masks corresponding with the number of said isolated areas has been completed, then cutting through each mask an opening corresponding in shape and size with one of said respective areas of the article within the reproduction of the barrier formed on the mask, then applying the masks successively to the article to cause the barriers of the latter to be engaged with said reproductions of the same appearing on the mask and projecting paints of respective selected colors through the openings of the masks in the order of their application to and removal from the article following the drying of each previously applied paint coating.

6. The method of decorating surfaces of transparent articles in multiple colors which consists in first moulding an article to provide on a face thereof a sunken area presenting a plurality of contiguous surface portions intended to have coatings of different respective colors applied thereto, contiguous surface portions being defined by V-shaped interposed ridges, then utilizing said sunken area to constitute a mold to produce bas relief counterparts of said sunken area by filling the latter with a manipulable material adapted to harden and removing the same therefrom when hard, the number of said counterparts being equal to the number of different colors to be applied to respective surface portions of said area, then cutting from each of said respective counterparts along the deepest portions of selected grooves thereof formed by said ridges a selected area to provide an opening therein corresponding in shape and size with a surface portion of said sunken area, then applying said counterpart successively to said sunken area and applying coloring materials of predetermined colors to exposed surfaces of said area through said openings following the application of each of said respective counterparts, each said coating being allowed to dry before another coating is applied to a surface portion.

EMIL IBACH.